(12) United States Patent
Choi et al.

(10) Patent No.: US 9,595,866 B2
(45) Date of Patent: Mar. 14, 2017

(54) HYSTERETIC SWITCHING REGULATOR INCLUDING A POWER CONVERTING UNIT AND A SWITCH DRIVING UNIT

(71) Applicant: SAMSUNG ELECTRONICS CO., LTD., Suwon-si, Gyeonggi-do (KR)

(72) Inventors: Min-Ho Choi, Seoul (KR); Dong-Jin Keum, Suwon-si (KR); Gil-Won Yoon, Seoul (KR); Yus Ko, Yongin-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 118 days.

(21) Appl. No.: 14/472,715

(22) Filed: Aug. 29, 2014

(65) Prior Publication Data

US 2015/0180338 A1 Jun. 25, 2015

(30) Foreign Application Priority Data

Dec. 24, 2013 (KR) ........................ 10-2013-0162839

(51) Int. Cl.
*H02M 3/156* (2006.01)

(52) U.S. Cl.
CPC ......... *H02M 3/1563* (2013.01); *H02M 3/156* (2013.01)

(58) Field of Classification Search
CPC .. H02M 3/155; H02M 3/1552; H02M 3/1557; H02M 3/156; H02M 3/1563; H02M 2003/1566; H02M 3/157; H02M 3/158; H02M 3/1582; H02M 3/1584
See application file for complete search history.

(56) References Cited

U.S. PATENT DOCUMENTS

| 6,147,478 | A | 11/2000 | Skelton et al. | |
|---|---|---|---|---|
| 7,132,820 | B2 | 11/2006 | Walters et al. | |
| 7,626,370 | B1* | 12/2009 | Mei | H02M 3/1563 323/222 |
| 7,714,562 | B2 | 5/2010 | Oswald et al. | |
| 7,825,646 | B2 | 11/2010 | Ishii et al. | |
| 2010/0213911 | A1* | 8/2010 | Oki | H02M 3/156 323/283 |
| 2012/0187932 | A1* | 7/2012 | Singnurkar | H02M 3/07 323/282 |
| 2013/0038310 | A1 | 2/2013 | Menegoli et al. | |
| 2013/0208520 | A1* | 8/2013 | Michishita | H02M 3/156 363/84 |

* cited by examiner

*Primary Examiner* — Jeffrey Gblende
(74) *Attorney, Agent, or Firm* — F. Chau & Associates, LLC

(57) ABSTRACT

A switching regulator includes a power converting unit and a switch driving unit. The power converting unit is configured to generate a direct current (DC) output voltage based on a switch driving signal and a DC input voltage. The switch driving unit is configured to generate a ripple voltage having information of an inductor current flowing through the power converting unit, add the ripple voltage to a reference voltage to generate a first voltage having a ripple, generate a feedback voltage based on the DC output voltage, compare the first voltage with the feedback voltage in a hysteresis mode to generate a comparison output, and generate the switch driving signal based on the comparison output.

19 Claims, 11 Drawing Sheets

HYSTERETIC SWITCHING REGULATOR INCLUDING A POWER CONVERTING UNIT AND A SWITCH DRIVING UNIT

CROSS-REFERENCE TO RELATED APPLICATION

This application claims priority under 35 U.S.C. §119 to Korean Patent Application No. 10-2013-0162839 filed on Dec. 24, 2013, the disclosure of which is incorporated by reference herein in its entirety.

TECHNICAL FIELD

Exemplary embodiments of the inventive concept relate to a power converter, and particularly to a switching regulator having a hysteresis characteristic.

DESCRIPTION OF RELATED ART

In a mobile information processing device that uses a battery, such as a cellular phone, a personal-digital-assistant (PDA) or the like, energy savings is important. A switch mode power supply such as a step-down converter, a boost converter, or a buck-boost converter is widely used in a variety of electronic systems, and may contribute in some fashion to energy conservation.

SUMMARY

Exemplary embodiments of the inventive concept provide a switching regulator capable of stably controlling a hysteresis loop.

In accordance with an exemplary embodiment of the inventive concept, a switching regulator may include a power converting unit and a switch driving unit.

The power converting unit is configured to generate a direct current (DC) output voltage based on a switch driving signal and a DC input voltage. The switch driving unit is configured to generate a ripple voltage having information of an inductor current flowing through the power converting unit, add the ripple voltage to a reference voltage to generate a first voltage having a ripple, generate a feedback voltage based on the DC output voltage, compare the first voltage with the feedback voltage in a hysteresis mode to generate a comparison output, and generate the switch driving signal based on the comparison output.

In an exemplary embodiment of the inventive concept, the switching regulator may be a booster converter.

In an exemplary embodiment of the inventive concept, the power converting unit may include an inductor, a power switch, a diode and a capacitor. The inductor is connected between a first node to which the DC input voltage is applied and a second node. The power switch is connected between the second node and a ground voltage, and configured to operate in response to the switch driving signal. The diode is connected between the second node and an output node. The capacitor is connected between the output node and the ground voltage.

In an exemplary embodiment of the inventive concept, the switch driving unit may include a ripple voltage generator, a summing circuit, a feedback circuit, a comparator and a gate driver. The ripple voltage generator is connected to the second node, and configured to generate the ripple voltage having the information of the inductor current flowing through the inductor. The summing circuit is configured to add the ripple voltage to the reference voltage to generate the first voltage having the ripple. The feedback circuit is configured to divide the DC output voltage to generate the feedback voltage. The comparator is configured to compare the first voltage with the feedback voltage in the hysteresis mode to generate the comparison output. The gate driver is configured to generate the switch driving signal based on the comparison output.

In an exemplary embodiment of the inventive concept, the ripple voltage generator may include a resistor, a first capacitor and a second capacitor. The resistor has a first terminal connected to the second node. The first capacitor has a first terminal connected to a second terminal of the resistor, and a second terminal to which a DC voltage is applied. The second capacitor has a first terminal connected to the second terminal of the resistor, and a second terminal from which the ripple voltage is output.

In an exemplary embodiment of the inventive concept, the ripple voltage generator may include a resistor, a first capacitor and a second capacitor. The resistor has a first terminal connected to the second node. The first capacitor has a first terminal connected to a second terminal of the resistor, and a second terminal connected to the first node. The second capacitor has a first terminal connected to the second terminal of the resistor, and a second terminal from which the ripple voltage is output.

In an exemplary embodiment of the inventive concept, the switch driving unit may include a ripple voltage generator, a feedback circuit, an amplifier, a summing circuit, a comparator and a gate driver. The ripple voltage generator is connected to the second node, and configured to generate the ripple voltage having the information of the inductor current flowing through the inductor. The feedback circuit is configured to divide the DC output voltage to generate the feedback voltage. The amplifier is configured to amplify a difference between the feedback voltage and a first reference voltage to generate a second reference voltage. The summing circuit is configured to add the ripple voltage to the second reference voltage to generate the first voltage having the ripple. The comparator is configured to compare the first voltage with the feedback voltage in the hysteresis mode to generate the comparison output. The gate driver is configured to generate the switch driving signal based on the comparison output.

In an exemplary embodiment of the inventive concept, the amplifier may include a two-input-pair differential amplifier having a first non-inverted input terminal and a second non-inverted input terminal to which the first reference voltage is applied, a first inverted input terminal to which the feedback voltage is applied, and a second inverted input terminal connected to an output terminal of the amplifier.

In an exemplary embodiment of the inventive concept, the amplifier may include a current source, a first NMOS transistor, a second NMOS transistor, a first PMOS transistor, a second PMOS transistor, a third PMOS transistor, and a fourth PMOS transistor. The current source is connected between a supply voltage and a third node. The first NMOS transistor has a gate and drain commonly connected to a fourth node, and a source connected to a ground voltage. The second NMOS transistor has a drain connected to a fifth node, a gate connected to the fourth node, and a source connected to the ground voltage. The first PMOS transistor has a source connected to the third node, a drain connected to the fourth node, and a gate to which the first reference voltage is applied. The second PMOS transistor has a source connected to the third node, a drain connected to the fourth node, and a gate to which the first reference voltage is applied. The third PMOS transistor has a source connected to the third node, and a drain and gate commonly connected to the fifth node. The fourth PMOS transistor has a source connected to the third node, a drain connected to the fifth node, and a gate to which the feedback voltage is applied, wherein the second reference voltage is output from the fifth node.

In an exemplary embodiment of the inventive concept, the switch driving unit may include a ripple voltage generator, a summing circuit, a feedback circuit, a first comparator, a second comparator and a gate driver. The ripple voltage generator is connected to the second node, and configured to generate the ripple voltage having the information of the inductor current flowing through the inductor. The summing circuit is configured to add the ripple voltage to the reference voltage to generate the first voltage having the ripple. The feedback circuit is configured to divide the DC output voltage to generate a first feedback voltage and a second feedback voltage. The first comparator is configured to compare the first voltage with the first feedback voltage to generate a first comparison output. The second comparator is configured to compare the first voltage with the second feedback voltage to generate a second comparison output. The gate driver is configured to generate the switch driving signal based on the first comparison output and the second comparison output.

In an exemplary embodiment of the inventive concept, the feedback circuit may include a first resistor, a second resistor and a third resistor. The first resistor has a first terminal connected to the output node. The second resistor has a first terminal connected to a second terminal of the first resistor. The third resistor is connected between a second terminal of the second resistor and the ground voltage. The first reference voltage is output from a connecting point of the first resistor and the second resistor, and the second reference voltage is output from a connecting point of the second resistor and the third resistor.

In an exemplary embodiment of the inventive concept, the power converting unit may include an inductor, a power switch, a PMOS transistor and a capacitor. The inductor is connected between a first node to which the DC input voltage is applied and a second node. The power switch is connected between the second node and a ground voltage, and configured to operate in response to a first switch driving signal. The PMOS transistor is connected between the second node and an output node, and configured to operate in response to a second switch driving signal. The capacitor is connected between the output node and the ground voltage.

In an exemplary embodiment of the inventive concept, the switch driving unit may include a ripple voltage generator, a summing circuit, a feedback circuit, a comparator and a gate driver. The ripple voltage generator is connected to the second node, and configured to generate the ripple voltage having the information of the inductor current flowing through the inductor. The summing circuit is configured to add the ripple voltage to the reference voltage to generate the first voltage having the ripple. The feedback circuit is configured to divide the DC output voltage to generate a feedback voltage. The comparator is configured to compare the first voltage with the feedback voltage in the hysteresis mode to generate the comparison output. The gate driver is configured to generate the first switch driving signal and the second switch driving signal based on the comparison output.

In an exemplary embodiment of the inventive concept, the power converting unit may include a power switch, a diode, an inductor and a capacitor. The power switch is connected between a first node to which the DC input voltage is applied and a second node, and configured to operate in response to the switch driving signal. The diode is connected between the second node and a ground voltage. The inductor is connected between the second node and an output node. The capacitor is connected between the output node and the ground voltage.

In an exemplary embodiment of the inventive concept, the switch driving unit may include a ripple voltage generator, a summing circuit, a feedback circuit, a comparator and a gate driver. The ripple voltage generator is connected to the second node, and configured to generate the ripple voltage having the information of the inductor current flowing through the inductor. The summing circuit is configured to add the ripple voltage to the reference voltage to generate the first voltage having the ripple. The feedback circuit is configured to divide the DC output voltage to generate the feedback voltage. The comparator is configured to compare the first voltage with the feedback voltage in the hysteresis mode to generate the comparison output. The gate driver is configured to generate the switch driving signal based on the comparison output.

In accordance with an exemplary embodiment of the inventive concept, a switching regulator may include: a first unit configured to generate a DC output voltage in response to a switch driving signal and a DC input voltage; and a second unit configured to control a hysteresis loop by comparing a feedback voltage and a first reference voltage indicative of an inductor current in a hysteresis mode, wherein the switch driving signal is based on the comparison of the feedback voltage and the first reference voltage.

The switching regulator may be a boost converter or a buck converter.

The second unit may include a summing circuit configured to add a ripple voltage based on the inductor current and a second reference voltage to produce the first reference voltage.

The inductor current may be provided from the first unit.

In accordance with an exemplary embodiment of the inventive concept, a power converter may include: a first unit configured to generate a DC output voltage in response to a switch driving signal and a DC input voltage; and a second unit configured to generate a ripple voltage based on an inductor current of the first unit, add the ripple voltage to a reference voltage to generate a first voltage, generate a feedback voltage based on the DC output voltage, compare the first voltage with the feedback voltage to generate a comparison output, and generate the switch driving signal based on the comparison output.

BRIEF DESCRIPTION OF THE DRAWINGS

The foregoing and other features of the inventive concept will become more apparent by describing in detail exemplary embodiments thereof with reference to the accompanying drawings. In the drawings.

DETAILED DESCRIPTION OF THE EMBODIMENTS

Figure 1:
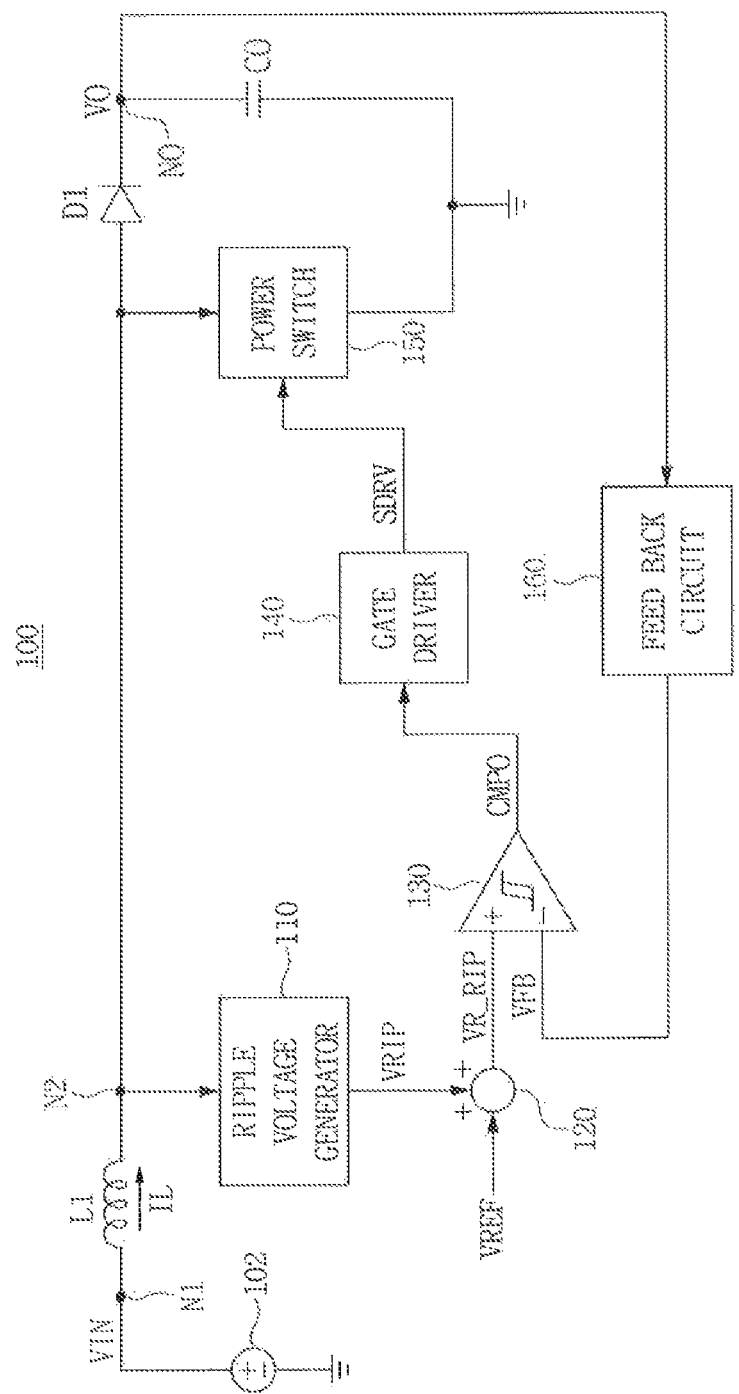
FIG. 1 is a circuit diagram illustrating a boost converter in accordance with an exemplary embodiment of the inventive concept.

Exemplary embodiments of the present inventive concept will now be described more fully with reference to the accompanying drawings. These inventive concepts may, however, be embodied in different forms and should not be construed as limited to the embodiments set forth herein. In the drawings, the sizes and relative sizes of layers and regions may be exaggerated for clarity.

It will be understood that when an element or layer is referred to as being "on," "to" or "coupled with" another element or layer, it can be directly on, connected or coupled to the other element or layer or intervening elements or layers may be present. Like numerals may refer to like elements throughout the specification and drawings.

As used herein, the singular forms "a," "an" and "the" are intended to include the plural forms as well, unless the context clearly indicates otherwise.

FIG. 1 is a circuit diagram illustrating a boost converter 100 in accordance with an exemplary embodiment of the inventive concept.

Referring to FIG. 1, the boost converter 100 may include a switch driving unit and a power converting unit.

The power converting unit generates a direct current (DC) output voltage VO based on a switch driving signal SDRV and a DC input voltage VIN. The switch driving unit generates a ripple voltage VRIP having information of an inductor current IL flowing through the power converting unit, adds the ripple voltage VRIP to a reference voltage VREF to generate a first voltage VR_RIP having a ripple, generates a feedback voltage VFB based on the DC output voltage VO, compares the first voltage VR_RIP with the feedback voltage VFB in a hysteresis mode to generate a comparison output CMPO, and generates the switch driving signal SDRV based on the comparison output CMPO.

The power converting unit may include an inductor L1, a power switch 150, a diode D1 and a capacitor CO. The inductor L1 is connected between a first node N1 to which the DC input voltage VIN is applied and a second node N2. The power switch 150 is connected between the second node N2 and a ground voltage, and operates in response to the switch driving signal SDRV. The diode D1 is connected between the second node N2 and an output node NO. The capacitor CO is connected between the output node NO and the ground voltage. The DC input voltage VIN may be generated by power source 102.

The switch driving unit may include a ripple voltage generator 110, a summing circuit 120, a feedback circuit 160, a comparator 130 and a gate driver 140. The ripple voltage generator 110 is connected to the second node N2, and generates the ripple voltage VRIP having the information of the inductor current IL flowing through the inductor L1. The summing circuit 120 adds the ripple voltage VRIP to the reference voltage VREF to generate the first voltage VR_RIP having the ripple. The feedback circuit 160 divides the DC output voltage VO to generate the feedback voltage VFB. The comparator 130 compares the first voltage VR_RIP with the feedback voltage VFB in the hysteresis mode to generate the comparison output CMPO. The gate driver 140 generates the switch driving signal SDRV based on the comparison output CMPO. The first voltage VR_RIP may have an opposite phase of the inductor current IL.

The boost converter 100 of FIG. 1 may operate as follows.

First, when the switch driving signal SDRV is activated, the power switch 150 is turned on and the inductor current IL flows through the inductor L1 and the power switch 150. In this condition, the inductor L1 converts electric energy into magnetic energy corresponding to the inductor current IL and stores the magnetic energy. Therefore, the longer the active period of the switch driving signal SDRV, the more magnetic energy is stored in the inductor L1.

Next, when the switch driving signal SDRV is inactivated, the power switch 150 is turned off and the magnetic energy stored in the inductor L1 during the active period of the switch driving signal SDRV is converted into electric energy. In other words, the inductor L1 generates the inductor current IL by an electromotive force according to a magnitude of the stored magnetic energy, and the inductor current IL flows through the diode D1 and the feedback circuit 160. Further, the inductor current IL charges the capacitor CO. The magnetic energy stored in the inductor L1 decreases at the same speed at which the magnetic energy increases.

Next, when the switch driving signal SDRV is activated again, the inductor current IL flows through the power switch 150, and the inductor L1 stores the magnetic energy again.

The boost converter 100 increases the electromotive force of the inductor L1 to increase the DC output voltage VO when a duty ratio of the switch driving signal SDRV increases, and when the duty ratio of the switch driving signal SDRV is increased, the boost converter 100 decreases the electromotive force of the inductor L1 to decrease the duty ratio of the switch driving signal SDRV to lower the DC output voltage VO.

As shown in FIG. 1, the duty ratio of the switch driving signal SDRV is changed according to a magnitude of the feedback voltage VFB which is a divided voltage of the DC output voltage VO. The boost converter 100 generates a ripple voltage VRIP having the information of the inductor current IL flowing through the power converting unit, adds the ripple voltage VRIP to a reference voltage VREF to generate a first voltage VR_RIP having a ripple, compares the first voltage VR_RIP with the feedback voltage VFB in a hysteresis mode to generate a comparison output CMPO, and generates the switch driving signal SDRV based on the comparison output CMPO. When a hysteresis window of the comparator 130 is 2d (e.g., d=10 mV) and the first voltage VR_RIP is smaller than VFB−d, the comparison output CMPO may be in a logic low state, and the switch driving signal SDRV may also be in a logic low state. In this condition, the power switch 150 is turned off and the inductor current IL flows through the diode D1, the capacitor CO and a load (not shown). In this condition, the inductor current IL may decrease but the ripple voltage VRIP increases. Therefore, the first voltage VR_RIP input to a non-inverted input terminal of the comparator 130 may increase.

When the first voltage VR_RIP is greater than VFB+d, the comparison output CMPO may be in a logic high state, and the switch driving signal SDRV, which is an output of the gate driver 140, may be in a logic low state, and the power switch 150 is turned on. By the repetition of this process, the boost converter 100 may normally perform a hysteretic loop control. In other words, the boost converter 100 may stably perform a hysteretic loop control because the first voltage VR_RIP, which is compared with the feedback voltage VFB, includes the information of the inductor current IL.

The ripple voltage VRIP, which is generated by the ripple voltage generator 110, has a larger value than a ripple voltage generated at the output node NO due to a parasitic resistance of a capacitor, an output capacitor and a load current of the ripple voltage generator 110. The operating frequency of the boost converter 100 may be determined by a difference of a ripple included in the feedback voltage VFB, and a hysteresis window size.

Figure 2:
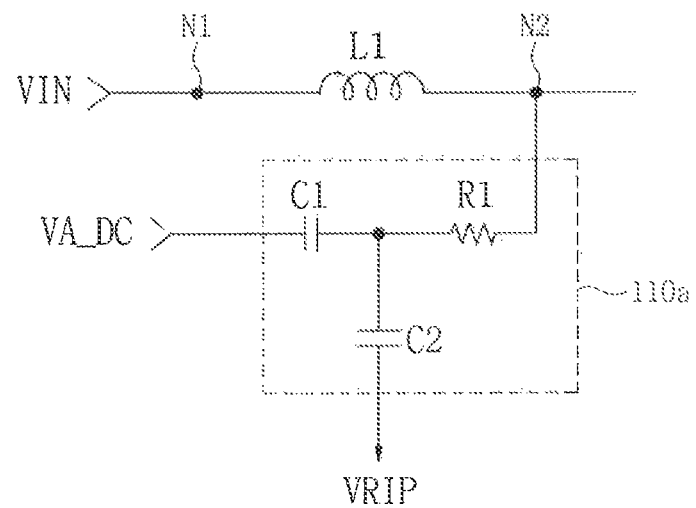
FIG. 2 is a circuit diagram illustrating an exemplary embodiment of a ripple voltage generator included in the boost converter of FIG. 1.

FIG. 2 is a circuit diagram illustrating an exemplary embodiment of a ripple voltage generator 11i a included in the boost converter 100 of FIG. 1.

Referring to FIG. 2, the ripple voltage generator 110a may include a resistor R1, a first capacitor C1 and a second capacitor C2. The resistor R1 has a first terminal connected to the second node N2. The first capacitor C1 has a first terminal connected to a second terminal of the resistor R1, and a second terminal to which a DC voltage VA_DC is applied. The second capacitor C2 has a first terminal connected to the second terminal of the resistor R1, and a second terminal from which the ripple voltage VRIP is output.

Figure 3:
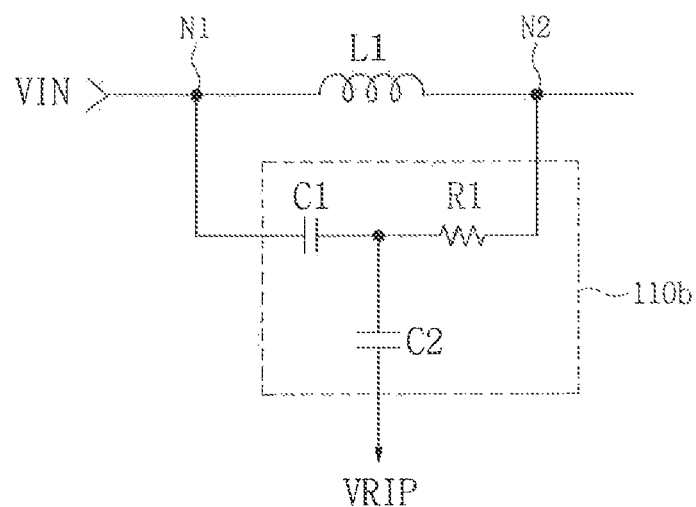
FIG. 3 is a circuit diagram illustrating an exemplary embodiment of a ripple voltage generator included in the boost converter of FIG. 1.

FIG. 3 is a circuit diagram illustrating an exemplary embodiment of a ripple voltage generator 110b included in the boost converter 100 of FIG. 1.

Referring to FIG. 3, the ripple voltage generator 110b may include a resistor R1, a first capacitor C1 and a second capacitor C2. The resistor R1 has a first terminal connected to the second node N2. The first capacitor C1 has a first terminal connected to a second terminal of the resistor R1, and a second terminal connected to the first node N1. The second capacitor C2 has a first terminal connected to the second terminal of the resistor R1, and a second terminal from which the ripple voltage VRIP is output.

Figure 4:
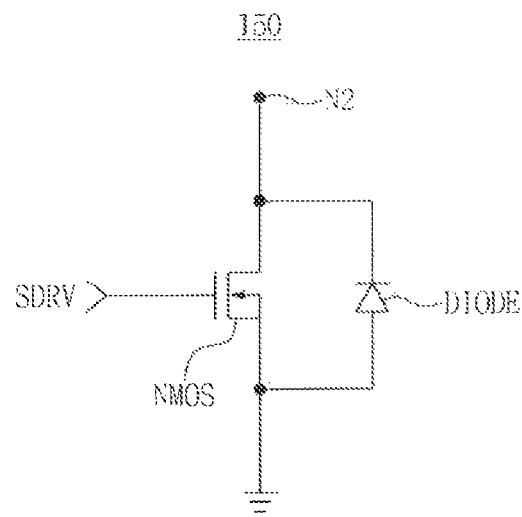
FIG. 4 is a circuit diagram illustrating an exemplary embodiment of a power switch included in the boost converter of FIG. 1.

FIG. 4 is a circuit diagram illustrating an exemplary embodiment of a power switch 150 included in the boost converter 100 of FIG. 1.

Referring to FIG. 4, the power switch 150 may include an NMOS transistor NMOS and a diode DIODE connected in parallel to each other. The NMOS transistor NMOS may receive the switch driving signal SDRV at a first terminal, have a second terminal connected to the second node N2 and a third terminal connected to the ground voltage. The diode DIODE may be connected to the second and third terminals of the NMOS transistor NMOS.

Figure 5:
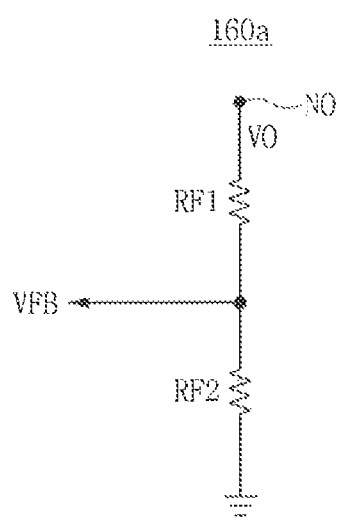
FIG. 5 is a circuit diagram illustrating an exemplary embodiment of a feedback circuit included in the boost converter of FIG. 1.

FIG. 5 is a circuit diagram illustrating an exemplary embodiment of a feedback circuit 160a included in the boost converter 100 of FIG. 1.

Referring to FIG. 5, the feedback circuit 160a may include resistors RF1 and RF2 serially connected between the output node NO and the ground voltage, and the feedback voltage VFB is output at the connection point of the two resistors RF1 and RF2.

Referring to FIG. 1 and FIG. 5, when a peak-to-peak voltage of the ripple voltage VRIP is VRIP_PP, and the peak-to-peak voltage of the DC output voltage VO is VO_PP, VRIP_PP may have a value larger than VO_PP* (RF2/(RF2+RF1)). The two resistors RF1 and RF2 are resistors included in the feedback circuit 160 of FIG. 1.

Figure 6:
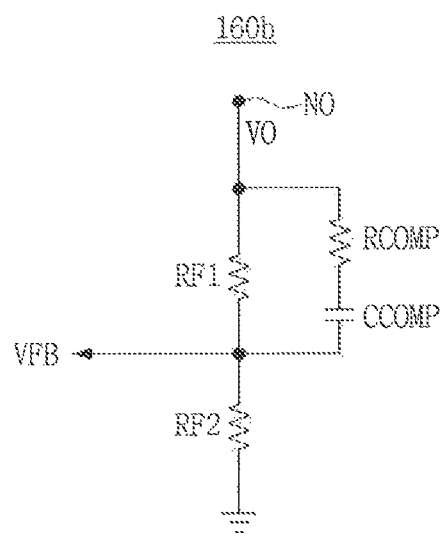
FIG. 6 is a circuit diagram illustrating an exemplary embodiment of a feedback circuit included in the boost converter of FIG. 1.

FIG. 6 is a circuit diagram illustrating an exemplary embodiment of a feedback circuit 160b included in the boost converter 100 of FIG. 1.

Referring to FIG. 6, the feedback circuit 160b may include resistors RF1 and RF2 serially connected between the output node NO and the ground voltage, and the feedback voltage VFB is output at the connection point of the two resistors RF1 and RF2. Further, the feedback circuit 160b may include a resistor RCOMP and a capacitor CCOMP serially connected to each other and connected between the output node NO and the connection point of the resistors RF1 and RF2. Such configuration may enable stable control of a feedback loop.

Figure 7:
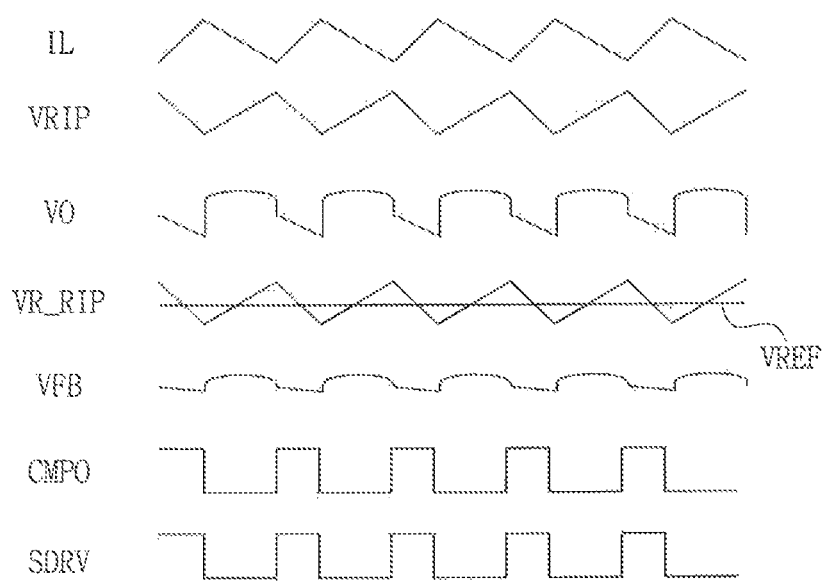
FIG. 7 is a timing diagram illustrating an operation of the boost converter of FIG. 1, according to an exemplary embodiment of the inventive concept.

FIG. 7 is a timing diagram illustrating an operation of the boost converter 100 of FIG. 1, according to an exemplary embodiment of the inventive concept.

Referring to FIG. 7, the ripple voltage VRIP is a signal having an opposite phase of the inductor current IL, and the DC output voltage VO is a pulse-type signal generated in the period in which the magnitude of the inductor current IL decreases. The first voltage VR_RIP is an added signal of the reference voltage VREF and the ripple voltage VRIP, and may have a similar waveform to the ripple voltage VRIP. The feedback voltage VFB may have a similar waveform to the DC output voltage VO, and may have a lower level than the DC output voltage VO. The comparison output CMPO and the switch driving signal SDRV may have a similar waveform to each other, and may have an opposite phase of the DC output voltage VO.

Figure 8:
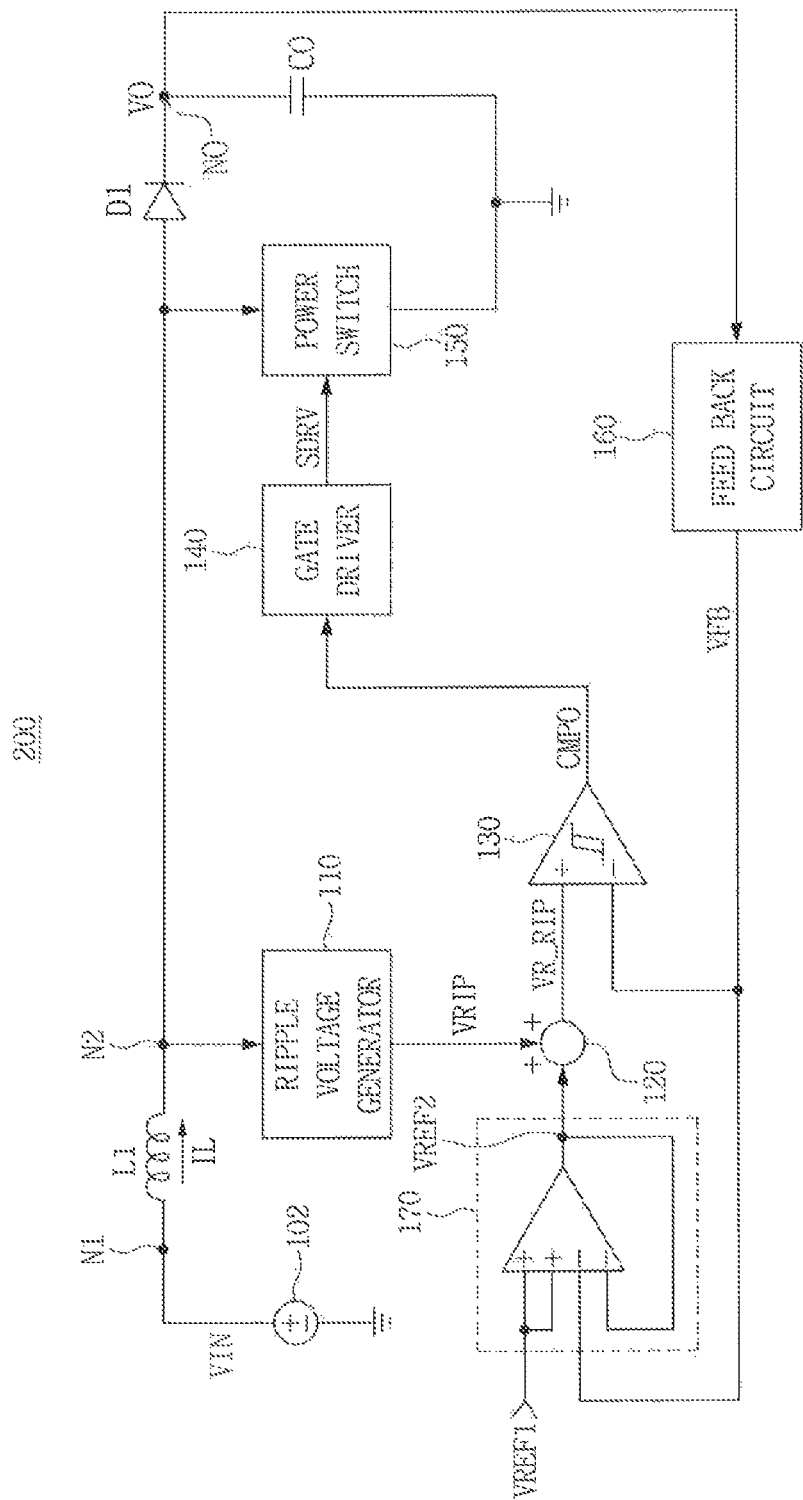
FIG. 8 is a circuit diagram illustrating a boost converter in accordance with an exemplary embodiment of the inventive concept.

FIG. 8 is a circuit diagram illustrating a boost converter 200 in accordance with an exemplary embodiment of the inventive concept.

Referring to FIG. 8, the boost converter 200 may include a switch driving unit and a power converting unit.

The power converting unit may include an inductor L1, a power switch 150, a diode D1 and a capacitor CO. The inductor L1 is connected between a first node N1 to which the DC input voltage VIN is applied and a second node N2. The power switch 150 is connected between the second node N2 and a ground voltage, and operates in response to the switch driving signal SDRV. The diode D1 is connected between the second node N2 and an output node NO. The capacitor CO is connected between the output node NO and the ground voltage. The DC input voltage VIN may be generated by power source 102. The switch driving unit may include a ripple voltage generator 110, a summing circuit 120, a feedback circuit 160, an amplifier 170, a comparator 130 and a gate driver 140. The ripple voltage generator 110 is connected to the second node N2, and generates the ripple voltage VRIP having the information of the inductor current IL flowing through the inductor L1. The feedback circuit 160 divides the DC output voltage VO to generate the feedback voltage VFB. The amplifier 170 amplifies a difference between the feedback voltage VFB and a first reference voltage VREF1 to generate a second reference voltage VREF2. The summing circuit 120 adds the ripple voltage VRIP to the second reference voltage VREF2 to generate the first voltage VR_RIP having the ripple. The comparator 130 compares the first voltage VR_RIP with the feedback voltage VFB in the hysteresis mode to generate the comparison output CMPO. The gate driver 140 generates the switch driving signal SDRV based on the comparison output CMPO. The first voltage VR_RIP may have an opposite phase of the inductor current IL.

According to an exemplary embodiment of the inventive concept, the amplifier 170 may be a two-input-pair differential amplifier having a first non-inverted input terminal and a second non-inverted input terminal to which the first reference voltage VREF1 is applied, a first inverted input terminal to which the feedback voltage VFB is applied, and a second inverted input terminal connected to an output terminal of the amplifier 170.

In the boost converter 200 of FIG. 8, the amplifier 170 may be a type of buffer that compensates a fluctuation of the DC output voltage VO. When the amplifier 170 has an ideal characteristic with an infinite gain, an output VREF2 of the amplifier 170 may be VREF1+(VREF1−VFB). Therefore, the output of the amplifier 170 may have an offset of VREF1−VFB, and therefore compensation for reducing an offset of the whole loop of the boost converter 200 may be performed such that the first reference voltage VREF1 is equal to the feedback voltage VFB.

Figure 9:
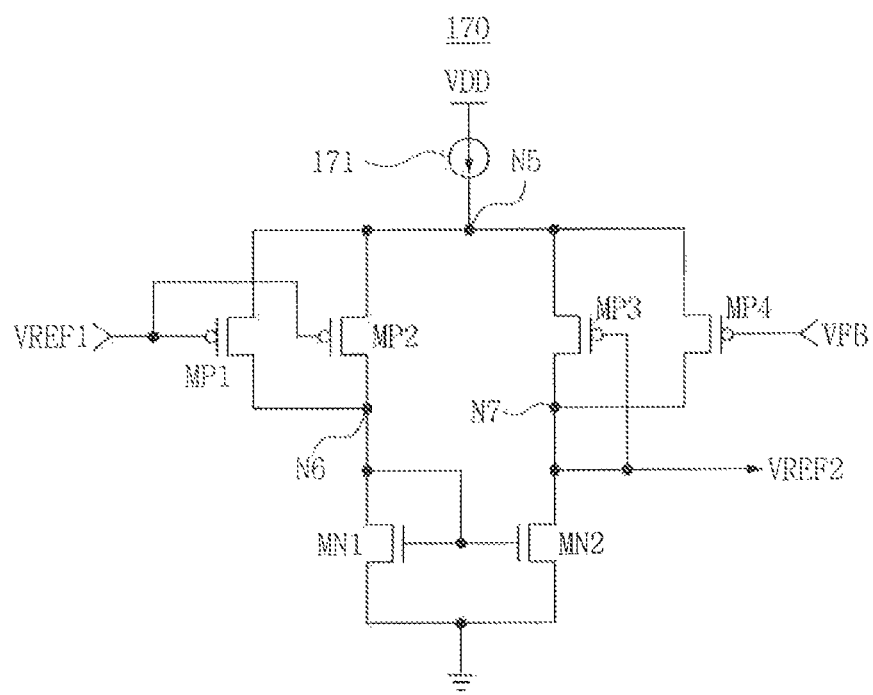
FIG. 9 is a circuit diagram illustrating an exemplary embodiment of an amplifier included in the boost converter of FIG. 8.

FIG. 9 is a circuit diagram illustrating an exemplary embodiment of an amplifier 170 included in the boost converter 200 of FIG. 8.

Referring to FIG. 9, the amplifier 170 may include a current source 171, a first NMOS transistor MN1, a second NMOS transistor MN2, a first PMOS transistor MP1, a second PMOS transistor MP2, a third PMOS transistor MP3 and a fourth PMOS transistor MP4.

The current source 171 is connected between a supply voltage VDD and a third node N5. The first NMOS transistor MN1 has a gate and drain commonly connected to a fourth node N6, and a source connected to a ground voltage. The second NMOS transistor MN2 has a drain connected to a fifth node N7, a gate connected to the fourth node N6, and a source connected to the ground voltage. The first PMOS transistor MP1 has a source connected to the third node N5, a drain connected to the fourth node N6, and a gate to which the first reference voltage VREF1 is applied. The second PMOS transistor MP2 has a source connected to the third node N5, a drain connected to the fourth node N6, and a gate to which the first reference voltage VREF1 is applied. The third PMOS transistor MP3 has a source connected to the third node N5, and a drain and gate commonly connected to the fifth node N7. The fourth PMOS transistor MP4 has a source connected to the third node N5, a drain connected to the fifth node N7, and a gate to which the feedback voltage VFB is applied, wherein the second reference voltage VREF2 is output from the fifth node N7.

Figure 10:
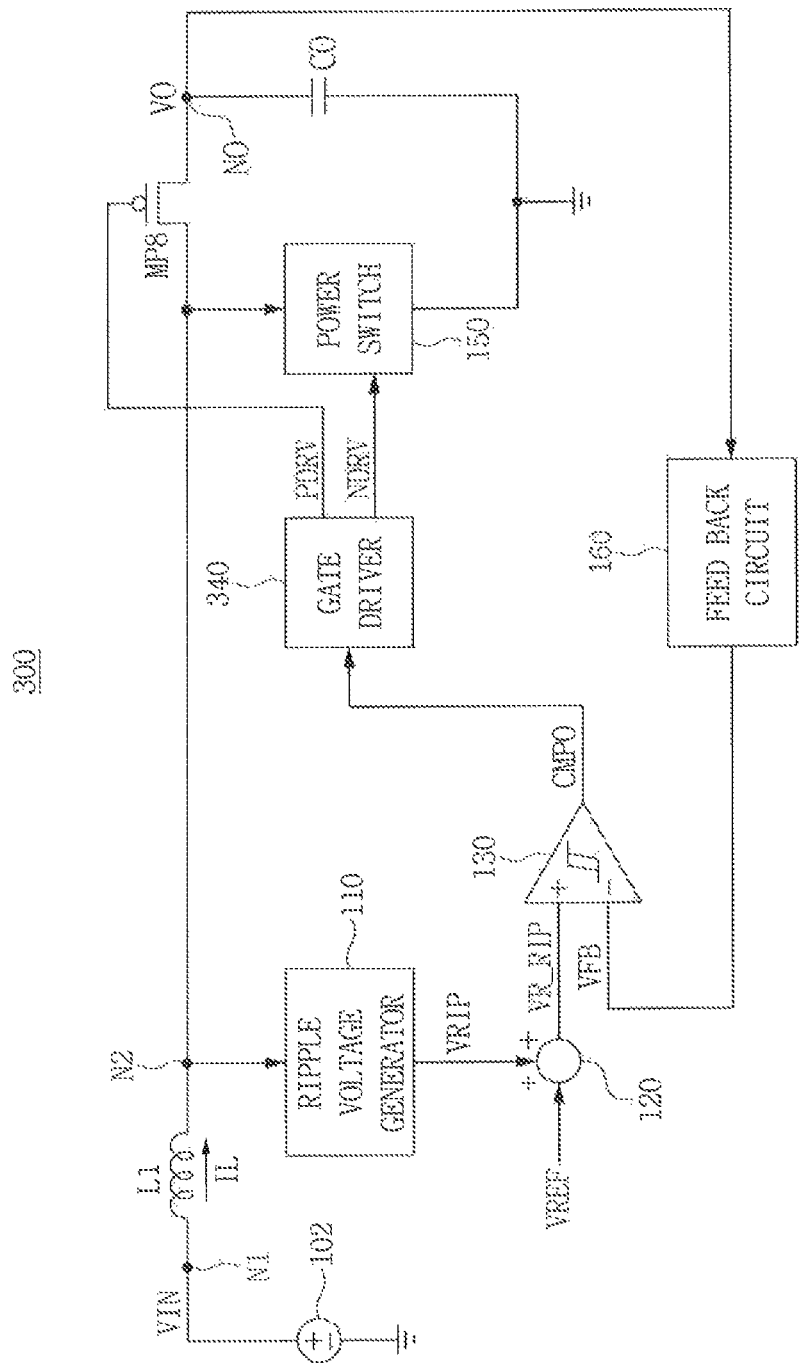
FIG. 10 is a circuit diagram illustrating a boost converter in accordance with an exemplary embodiment of the inventive concept.

FIG. 10 is a circuit diagram illustrating a boost converter 300 in accordance with an exemplary embodiment of the inventive concept.

Referring to FIG. 10, the boost converter 300 may include a switch driving unit and a power converting unit.

The power converting unit may include an inductor L1, a power switch 150, a PMOS transistor MP8 and a capacitor CO. The inductor L1 is connected between a first node N1 to which the DC input voltage VIN is applied and a second node N2. The power switch 150 is connected between the second node N2 and a ground voltage, and operates in response to a first switch driving signal NDRV. The PMOS transistor MP8 is connected between the second node N2 and an output node NO, and operates in response to a second switch driving signal PDRV. The capacitor CO is connected between the output node NO and the ground voltage. The DC input voltage VIN may be generated by power source 102.

The switch driving unit may include a ripple voltage generator 110, a summing circuit 120, a feedback circuit 160, a comparator 130 and a gate driver 340. The ripple voltage generator 110 is connected to the second node N2, and generates the ripple voltage VRIP having the information of the inductor current IL flowing through the inductor L1. The summing circuit 120 adds the ripple voltage VRIP to the reference voltage VREF to generate the first voltage VR_RIP having the ripple. The feedback circuit 160 divides the DC output voltage VO to generate the feedback voltage VFB. The comparator 130 compares the first voltage VR_RIP with the feedback voltage VFB in the hysteresis mode to generate the comparison output CMPO. The gate driver 340 generates the first switch driving signal NDRV and the second switch driving signal PDRV based on the comparison output CMPO. The first voltage VR_RIP may have an opposite phase of the inductor current IL.

The boost converter 300 of FIG. 10 includes the PMOS transistor MP8 instead of the diode D1 included in the boost converter 100 of FIG. 1. The gate driver 340 generates the first switch driving signal NDRV and the second switch driving signal PDRV, provides the first switch driving signal NDRV to the power switch 150, and provides the second switch driving signal PDRV to the PMOS transistor MP8.

Figure 11:
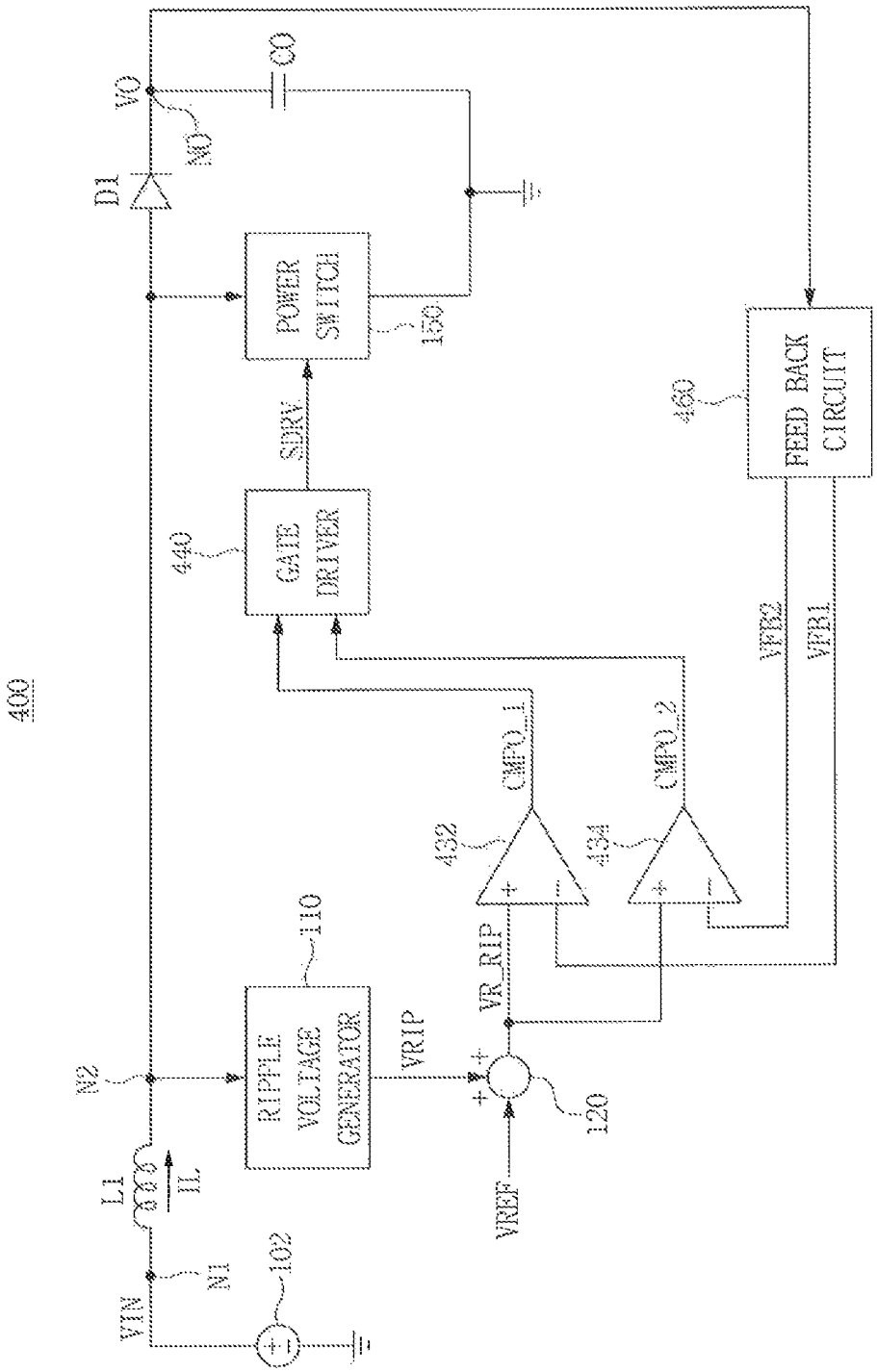
FIG. 11 is a circuit diagram illustrating a boost converter in accordance with an exemplary embodiment of the inventive concept.

FIG. 11 is a circuit diagram illustrating a boost converter 400 in accordance with an exemplary embodiment of the inventive concept.

Referring to FIG. 11, the boost converter 400 may include a switch driving unit and a power converting unit.

The power converting unit may include an inductor L1, a power switch 150, a diode D1 and a capacitor CO. The inductor L1 is connected between a first node N1 to which the DC input voltage VIN is applied and a second node N2. The power switch 150 is connected between the second node N2 and a ground voltage, and operates in response to the switch driving signal SDRV. The diode D1 is connected between the second node N2 and an output node NO. The capacitor CO is connected between the output node NO and the ground voltage. The DC input voltage VIN may be generated by power source 102.

The switch driving unit may include a ripple voltage generator 110, a summing circuit 120, a feedback circuit 460, a first comparator 432, a second comparator 434, and a gate driver 440. The ripple voltage generator 110 is connected to the second node N2, and generates the ripple voltage VRIP having the information of the inductor current IL flowing through the inductor L1. The summing circuit 120 adds the ripple voltage VRIP to the reference voltage VREF to generate the first voltage VR_RIP having the ripple. The feedback circuit 460 divides the DC output voltage VO to generate a first feedback voltage VFB1 and a second feedback voltage VFB2. The first comparator 432 compares the first voltage VR_RIP with the first feedback voltage VFB1 to generate a first comparison output CMPO_1. The second comparator 434 compares the first voltage VR_RIP with the second feedback voltage VFB2 to generate a second comparison output CMPO_2. The gate driver 440 generates the switch driving signal SDRV based on the first comparison output CMPO_1 and the second comparison output CMPO_2. The first voltage VR_RIP may have an opposite phase of the inductor current IL.

The boost converter 400 of FIG. 11 performs hysteretic loop control using two comparators 432 and 434 having no hysteresis.

Figure 12:
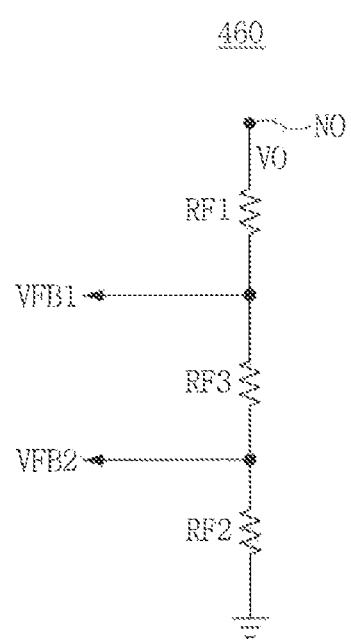
FIG. 12 is a circuit diagram illustrating an exemplary embodiment of a feedback circuit included in the boost converter of FIG. 11.

FIG. 12 is a circuit diagram illustrating an exemplary embodiment of a feedback circuit 460 included in the boost converter 400 of FIG. 11.

Referring to FIG. 12, the feedback circuit 460 includes a first resistor RF1 having a first terminal connected to the output node NO, a second resistor RF3 having a first terminal connected to a second terminal of the first resistor RF1, and a third resistor RF2 connected between a second terminal of the second resistor RF3 and the ground voltage. The first feedback voltage VFB1 is output from a connecting point of the first resistor RF1 and the second resistor RF3, and the second feedback voltage VFB2 is output from a connecting point of the second resistor RF3 and the third resistor RF2.

Figure 13:
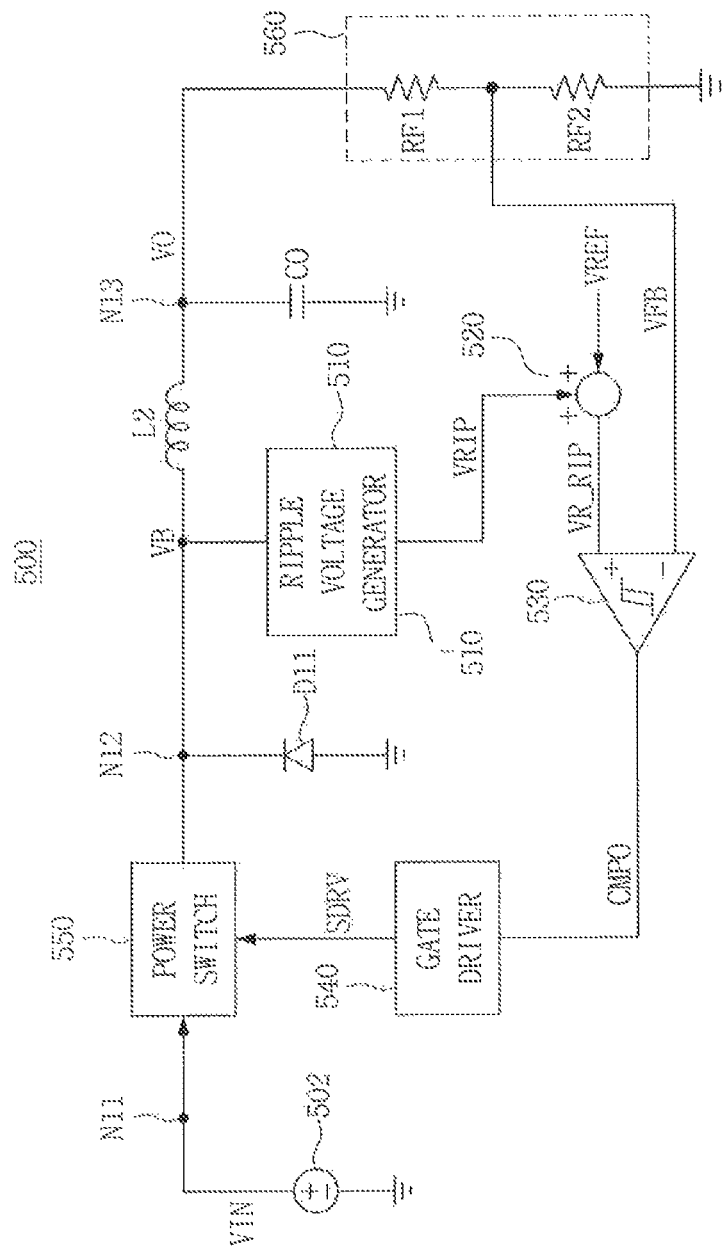
FIG. 13 is a circuit diagram illustrating a buck converter in accordance with an exemplary embodiment of the inventive concept.

FIG. 13 is a circuit diagram illustrating a buck converter 500 in accordance with an exemplary embodiment of the inventive concept.

Referring to FIG. 13, the buck converter 500 may include a switch driving unit and a power converting unit.

The power converting unit may include a power switch 550 connected between a first node N11 to which the DC input voltage VIN is applied and a second node N12, and configured to operate in response to the switch driving signal, a diode D11 connected between the second node N12 and a ground voltage, an inductor L2 connected between the second node N12 and an output node N13, and a capacitor CO connected between the output node N13 and the ground voltage. The DC input voltage VIN may be generated by power source 502.

The switch driving unit may include a ripple voltage generator 510, a summing circuit 520, a feedback circuit 560, a comparator 530 and a gate driver 540. The ripple voltage generator 510 is connected to the second node N12, and generates the ripple voltage VRIP having the information of the inductor current flowing through the inductor L2. The summing circuit 520 adds the ripple voltage VRIP to the reference voltage VREF to generate the first voltage VR_RIP having the ripple. The feedback circuit 560 divides the DC output voltage VO to generate the feedback voltage VFB. The comparator 530 compares the first voltage VR_RIP with the feedback voltage VFB in the hysteresis mode to generate the comparison output CMPO. The gate driver 540 generates the switch driving signal SDRV based on the comparison output CMPO. The feedback circuit 560 may include resistors RF1 and RF2.

Figure 14:
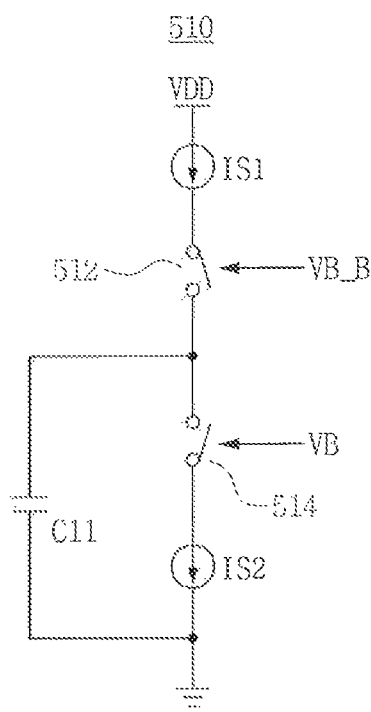
FIG. 14 is a circuit diagram illustrating an exemplary embodiment of a ripple voltage generator included in the buck converter of FIG. 13.

FIG. 14 is a circuit diagram illustrating an exemplary embodiment of a ripple voltage generator 510 included in the buck converter 500 of FIG. 13.

Referring to FIG. 14, the ripple voltage generator 510 may include a current source IS1 having a first terminal connected to a supply voltage VDD, a first switch 512 having a first terminal connected to a second terminal of the current source IS1, and operative in response to a first control signal VB_B, a second switch 514 having a first terminal connected to a second terminal of the first switch 512, and operative in response to a second control signal VB, a second current source IS2 connected between a second terminal of the second switch 514 and a ground voltage, and a capacitor C11 connected between the first terminal of the second switch 514 and the ground voltage. The second control signal VB may be a voltage signal of the second node N12 in FIG. 13.

The switching regulator according to an exemplary embodiment of the inventive concept is able to stably control a hysteresis loop because a feedback voltage and a reference voltage having information of an inductor current are compared in a hysteresis mode by a comparator. The switching regulator according to an exemplary embodiment of the inventive concept may have a less complicated circuit structure, a high operating stability, and a high response speed.

Exemplary embodiments of the inventive concept may apply to a power converter, and particularly to a switching regulator that performs a hysteretic control.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

What is claimed is:

1. A switching regulator, comprising:
    a power converting unit configured to generate a direct current (DC) output voltage based on a switch driving signal and a DC input voltage; and
    a switch driving unit configured to generate a ripple voltage having information of an inductor current flowing through the power converting unit, add the ripple voltage to a reference voltage to generate a first voltage having a ripple, generate a feedback voltage based on the DC output voltage, compare the first voltage with the feedback voltage in a hysteresis mode to generate a comparison output, and generate the switch driving signal based on the comparison output,
    wherein the power converting unit comprises:
    an inductor connected between a first node to which the DC input voltage is applied and a second node;
    a power switch connected to the second node, and configured to operate in response to the switch driving signal,
    wherein the switch driving unit comprises:
    a ripple voltage generator connected to the second node, and configured to generate the ripple voltage having the information of the inductor current flowing through the inductor,
    wherein the ripple voltage generator comprises:
    a resistor having a first terminal connected to the second node;
    a first capacitor having a first terminal connected to a second terminal of the resistor; and
    a second capacitor having a first terminal connected to the second terminal of the resistor, and a second terminal from which the ripple voltage is output.

2. The switching regulator of claim 1, wherein the switching regulator is a boost converter.

3. The switching regulator of claim 2, wherein the power converting unit comprises:
    a diode connected between the second node and an output node; and
    a capacitor connected between the output node and a ground voltage,
    wherein the power switch is connected between the second node and the ground voltage.

4. The switching regulator of claim 3, wherein the switch driving unit comprises:
a summing circuit configured to add the ripple voltage to the reference voltage to generate the first voltage having the ripple;
a feedback circuit configured to divide the DC output voltage to generate the feedback voltage;
a comparator configured to compare the first voltage with the feedback voltage in the hysteresis mode to generate the comparison output; and
a gate driver configured to generate the switch driving signal based on the comparison output.

5. The switching regulator of claim 4, wherein the first capacitor has a second terminal to which a DC voltage is applied.

6. The switching regulator of claim 4, wherein the first capacitor has a second terminal connected to the first node.

7. A switching regulator, comprising:
a power converting unit configured to generate a direct current (DC) output voltage based on a switch driving signal and a DC input voltage; and
a switch driving unit configured to generate a ripple voltage having information of an inductor current flowing through the power converting unit, add the ripple voltage to a reference voltage to generate a first voltage having a ripple, generate a feedback voltage based on the DC output voltage, compare the first voltage with the feedback voltage in a hysteresis mode to generate a comparison output, and generate the switch driving signal based on the comparison output,
wherein the power converting unit comprises:
an inductor connected between a first node to which the DC input voltage is applied and a second node;
a power switch connected between the second node and a ground voltage, and configured to operate in response to the switch driving signal;
a diode connected between the second node and an output node; and
a capacitor connected between the output node and the ground voltage,
wherein the switch driving unit comprises:
a ripple voltage generator connected to the second node, and configured to generate the ripple voltage having the information of the inductor current flowing through the inductor;
a feedback circuit configured to divide the DC output voltage to generate the feedback voltage;
an amplifier configured to amplify a difference between the feedback voltage and a first reference voltage to generate a second reference voltage;
a summing circuit configured to add the ripple voltage to the second reference voltage to generate the first voltage having the ripple;
a comparator configured to compare the first voltage with the feedback voltage in the hysteresis mode to generate the comparison output; and
a gate driver configured to generate the switch driving signal based on the comparison output.

8. The switching regulator of claim 7, wherein the amplifier includes a two-input-pair differential amplifier having a first non-inverted input terminal and a second non-inverted input terminal to which the first reference voltage is applied, a first inverted input terminal to which the feedback voltage is applied, and a second inverted input terminal connected to an output terminal of the amplifier.

9. The switching regulator of claim 7, wherein the amplifier comprises:

a current source connected between a supply voltage and a third node;
a first NMOS transistor having a gate and drain commonly connected to a fourth node, and a source connected to a ground voltage;
a second NMOS transistor having a drain connected to a fifth node, a gate connected to the fourth node, and a source connected to the ground voltage;
a first PMOS transistor having a source connected to the third node, a drain connected to the fourth node, and a gate to which the first reference voltage is applied;
a second PMOS transistor having a source connected to the third node, a drain connected to the fourth node, and a gate to which the first reference voltage is applied;
a third PMOS transistor having a source connected to the third node, a drain and gate commonly connected to the fifth node; and
a fourth PMOS transistor having a source connected to the third node, a drain connected to the fifth node, and a gate to which the feedback voltage is applied, wherein the second reference voltage is output from the fifth node.

10. The switching regulator of claim 3, wherein the switch driving unit comprises:
a summing circuit configured to add the ripple voltage to the reference voltage to generate the first voltage having the ripple;
a feedback circuit configured to divide the DC output voltage to generate a first feedback voltage and a second feedback voltage;
a first comparator configured to compare the first voltage with the first feedback voltage to generate a first comparison output;
a second comparator configured to compare the first voltage with the second feedback voltage to generate a second comparison output; and
a gate driver configured to generate the switch driving signal based on the first comparison output and the second comparison output.

11. The switching regulator of claim 10, wherein the feedback circuit comprises:
a first resistor having a first terminal connected to the output node;
a second resistor having a first terminal connected to a second terminal of the first resistor; and
a third resistor connected between a second terminal of the second resistor and the ground voltage,
wherein a first reference voltage is output from a connecting point of the first resistor and the second resistor, and a second reference voltage is output from a connecting point of the second resistor and the third resistor.

12. The switching regulator of claim 2, wherein the power converting unit comprises:
a PMOS transistor connected between the second node and an output node, and configured to operate in response to a second switch driving signal; and
a capacitor connected between the output node and a ground voltage,
wherein the power switch is connected between the second node and the ground voltage.

13. The switching regulator of claim 12, wherein the switch driving unit comprises:
a summing circuit configured to add the ripple voltage to the reference voltage to generate the first voltage having the ripple;

a feedback circuit configured to divide the DC output voltage to generate a feedback voltage;

a comparator configured to compare the first voltage with the feedback voltage in the hysteresis mode to generate the comparison output; and a gate driver configured to generate the first switch driving signal and the second switch driving signal based on the comparison output.

14. A switching regulator, comprising:

a first unit configured to generate a direct current (DC) output voltage in response to a switch driving signal and a DC input voltage; and a second unit configured to control a hysteresis loop by comparing a feedback voltage and a first reference voltage indicative of an inductor current in a hysteresis mode, wherein the switch driving signal is based on the comparison of the feedback voltage and the first reference voltage, wherein the second unit includes a summing circuit configured to add a ripple voltage based on the inductor current and a second reference voltage to produce the first reference voltage, wherein the ripple voltage is provided from a ripple voltage generator comprising:

a resistor having a first terminal connected to a power switch;

a first capacitor having a first terminal connected to a second terminal of the resistor, and a second terminal to which a DC voltage is applied; and a second capacitor having a first terminal connected to the second terminal of the resistor; and a second terminal from which the ripple voltage is output.

15. The switching regulator of claim 14, wherein the switching regulator is a boost converter or a buck converter.

16. The switching regulator of claim 14, wherein the first unit comprises:

the power switch which is connected between a first node to which the DC input voltage is applied and a second node, and configured to operate in response to the switch driving signal;

a diode connected between the second node and a ground voltage;

an inductor connected between the second node and an output node; and a capacitor connected between the output node and the ground voltage.

17. The switching regulator of claim 16, wherein the switch driving unit comprises;

the ripple voltage generator which is connected to the second node, and configured to generate the ripple voltage having the information of the inductor current flowing through the inductor;

a feedback circuit configured to divide the DC output voltage to generate the feedback voltage;

a comparator configured to compare the first reference voltage with the feedback voltage in the hysteresis mode to generate a comparison output; and a gate driver configured to generate the switch driving signal based on the comparison output.

18. The switching regulator of claim 14, wherein the inductor current is provided from the first unit.

19. A power converter, comprising:

a first unit configured to generate a direct current (DC) output voltage in response to a switch driving signal and a DC input voltage; and a second unit configured to generate a ripple voltage based on an inductor current of the first unit, add the ripple voltage to a reference voltage to generate a first voltage, generate a feedback voltage based on the DC output voltage, compare the first voltage with the feedback voltage to generate a comparison output, and generate the switch driving signal based on the comparison output, wherein the ripple voltage is provided from a ripple voltage generator comprising:

a resistor having a first terminal connected to a second node disposed between a first node to which the DC input voltage is applied and a power switch;

a first capacitor having a first terminal connected to a second terminal of the resistor, and a second terminal connected to the first node; and a second capacitor having a first terminal connected to the second terminal of the resistor, and a second terminal from which the ripple voltage is output.

* * * * *